April 7, 1936.　　　H. G. HOHWIESNER　　　2,036,699
FLOAT FOR WATER GAUGES
Filed March 21, 1934
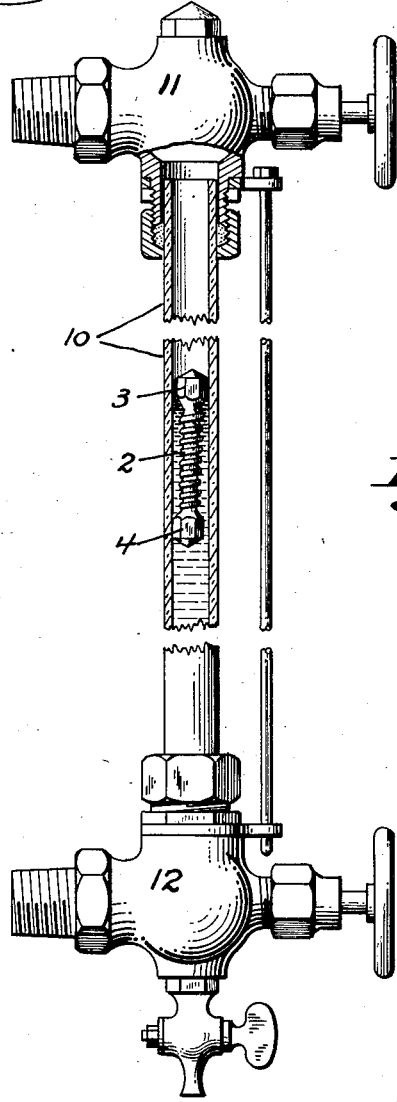
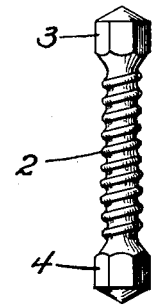
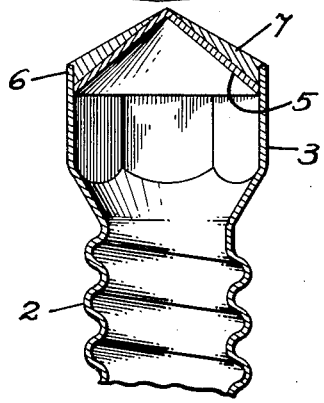
INVENTOR.
Henry G. Hohwiesner.
BY Townsend & Loftus.
ATTORNEYS.

Patented Apr. 7, 1936

2,036,699

UNITED STATES PATENT OFFICE 2,036,699

FLOAT FOR WATER GAUGES

Henry G. Hohwiesner, Sacramento, Calif.

Application March 21, 1934, Serial No. 716,620

3 Claims. (Cl. 73—82)

This invention relates to floats for water gauges to indicate the water level in a steam boiler, or the like.

There is a need for a float in water gauges that will at all times accurately and clearly indicate the actual water level in the boiler. Many boilers explode each year with the resultant loss of life and property caused by low water in the boiler. Most of these accidents are caused by the fireman or water tender being unable to clearly see the water level in the gauge glass due to reflections of light on the gauge glass and, in some instances, by discoloration of the gauge glass, and so on, with the result that a false reading is obtained. Many boiler rooms are poorly lighted. In some instances the gauge glass is positioned at a comparatively high elevation with relation to the floor level and, if the fireman has defective eyesight it obviously becomes difficult to discern the small target presented by the water line in the gauge glass.

The object of the present invention is generally to improve and simplify the construction and operation of floats for use in water gauges; to provide a float which is clearly visible from any angle in front of the boiler and which is adapted to be applied in existing installations without requiring any changes; to provide a float which functions as an enlarged target to indicate the water level in the gauge glass and which is non-corrosive and capable of withstanding high boiler pressure without danger of collapsing; and further, to provide a float which is positive in operation, non-fouling in the gauge cocks, will not adhere to the sides of the gauge glass and which is capable of withstanding severe strains and impact action caused by blowing down the gauge glass.

The float is shown by way of illustration in the accompanying drawing in which—

Fig. 1 is a side elevation of a gauge glass and the blow-off cocks in which it is mounted, said view being partially in section.

Fig. 2 is a side elevation of the float.

Fig. 3 is an enlarged cross section of the gauge glass showing the float mounted within the same.

Fig. 4 is an enlarged sectional view of the upper end of the float showing the manner in which the end caps are inserted and secured.

Extensive experiments have shown that in order to obtain a thoroughly buoyant metal float in the small area of a boiler gauge glass it is necessary to use a very light gauge metal and, further, that when a metal of this character is employed proper reinforcing is necessary in order to avoid collapse when the float is subjected to high boiler pressures.

The float disclosed in this invention is designed to resist an external pressure of several hundred pounds. The float is tubular in form and of sufficient length to insure ample buoyancy within the narrow confines of a gauge glass. In actual practice a tube of suitable length is first spun or pressed to form a series of circumferentially arranged corrugations, such as indicated at 2. The ends are then expanded to form a pair of hexagonal or polyfaced head members 3 and 4, one at each end, which are closed by means of end caps such as indicated at 5. The caps are preferably convex or cone-shaped, as shown in Fig. 4, to resist external pressure and are pressed into the heads a sufficient distance to form surrounding annular shoulders, such as shown at 6, after which they are welded or otherwise secured in position so as to positively seal the ends of the float.

A float of this character must be perfectly balanced so that the top of the upper head will be level with the water line in the gauge glass. This is accomplished by applying a metal or alloy of suitable character in the annular recess 6, such as indicated at 7, and gradually tapering it off toward the top of the cap. Metal, when so applied, serves as a buoyancy balancing medium and an accurate balance can be obtained by grinding away or applying the metal as needed making the operation of balancing the float simple, effective and accurate.

Boiler water in general use is in most instances corrosive in action, or contains certain minerals, which cause deterioration of the more common metals. For this reason the float is preferably constructed of a metal which is non-corrosive and which will also resist electrolytic action present under certain conditions. A copper tube plated with nickel or chromium, or the like, serves this purpose and besides that forms a reflecting surface which materially increases the visibility of the float.

The float when used is placed within the gauge glass 10, as shown in Fig. 1, and when so placed rises and falls as the water level increases or decreases. Due to its length and shape it is impossible for the float to foul or become lodged in either the top or bottom gauge cocks indicated at 11 and 12. The non-fouling feature is important and is accomplished by the elimination of any protruding flanges or shoulders which would cause it to catch in either end of the gauge glass or in either gauge cock. Further, by making the float sufficiently long, it will always project into the visible portion of the gauge glass thereby indicating its position and insuring freedom of action in either direction.

It has been proven by experiments that a float having straight sides has a tendency to adhere to the sides of the gauge glass by capillary attraction and may remain in a position higher than the actual water level. The float shown in the present instance has been designed to eliminate any possibility of this occurring and this is accomplished by making the sides of the heads poly-faced and the corrugated tubular portion of smaller diameter in the heads. This reduces friction between the float and the glass, causing the float to be completely surrounded by an equal volume of water, and as such overcomes any tendency of the capillary attraction interfering with the free movement of the float as the water level changes.

The corrugations employed are necessary from the standpoint of strength but they have other advantageous features, to wit, that of setting up some friction or resistance to the too rapid passage of water by the float. That is, as the water rises and falls it engages the corrugations and thereby increases the sensitivity of the float to rise and fall with the constant fluctuations in water level. The corrugations, furthermore, form reflecting surfaces when the float is plated and thereby materially increases visibility.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:

1. A float of the character described comprising an elongated tubular member, an enlarged head portion at each end of the tube, a closure cap for each head and sealed with relation thereto, and circumferentially arranged corrugations formed in the tube extending substantially from end to end thereof, said corrugations reinforcing the tube against collapse when subjected to external pressure and also forming reflecting surfaces to increase the visibility of the float when placed within a gauge glass.

2. A float of the character described comprising an elongated tubular member, a head member at each end thereof, said head members being larger in diameter than the tube, a closure cap for each head member and secured therein to seal the head members and the tube, said cap members fitting the interior surface of the head members and being inserted a sufficient distance to form an annular recess between the upper ends of the heads and the closure caps, and a buoyancy balancing medium insertable in said annular recess.

3. A float of the character described comprising an elongated tubular member, a head member at each end thereof, said head members being larger in diameter than the tube, a closure cap for each head member and secured therein to seal the head members and the tube, said cap members fitting the interior surface of the head members and being inserted a sufficient distance to form an annular recess between the upper ends of the heads and the closure caps, a buoyancy balancing medium insertable in said annular recess, and said closure caps being cone-shaped to resist external pressure.

HENRY G. HOHWIESNER.